United States Patent
Sunayama

(10) Patent No.: US 8,760,672 B2
(45) Date of Patent: Jun. 24, 2014

(54) TIME MEASURING APPARATUS AND IMAGE FORMING APPARATUS

(75) Inventor: Satoshi Sunayama, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 1199 days.

(21) Appl. No.: 12/277,706

(22) Filed: Nov. 25, 2008

(65) Prior Publication Data

US 2009/0185211 A1  Jul. 23, 2009

(30) Foreign Application Priority Data

Jan. 22, 2008  (JP) .................................. 2008-011792

(51) Int. Cl.
*G06F 3/12* (2006.01)
*G06F 1/06* (2006.01)

(52) U.S. Cl.
USPC ......... 358/1.13; 358/1.14; 713/300; 713/320; 713/321; 713/323

(58) Field of Classification Search
USPC ........ 358/1.13, 1.14; 713/300, 321, 323, 375, 713/400
See application file for complete search history.

(56) References Cited

U.S. PATENT DOCUMENTS

| 5,758,132 A * | 5/1998 | Stråhlin ......................... 713/501 |
| 6,535,926 B1 * | 3/2003 | Esker ............................. 709/248 |
| 6,539,049 B1 * | 3/2003 | McDonough et al. ........ 375/145 |
| 7,890,784 B2 * | 2/2011 | Katoh ........................... 713/323 |
| 2004/0151513 A1 * | 8/2004 | Nomura .............................. 399/8 |
| 2005/0228562 A1 | 10/2005 | Sayama et al. |
| 2006/0269341 A1 * | 11/2006 | Aoki et al. ...................... 400/62 |
| 2007/0260358 A1 * | 11/2007 | Katoh ........................... 700/286 |
| 2008/0114996 A1 * | 5/2008 | Suzuki ........................... 713/320 |

FOREIGN PATENT DOCUMENTS

| JP | 2000-232540 | 8/2000 |
| JP | 2004-085722 | 3/2004 |
| JP | 2005-017870 | 1/2005 |
| JP | 2005-299517 | 10/2005 |

* cited by examiner

*Primary Examiner* — Mark Zimmerman
*Assistant Examiner* — Lawrence Wills
(74) *Attorney, Agent, or Firm* — Frommer Lawrence & Haug LLP

(57) ABSTRACT

The present invention teaches and claims an image forming apparatus using a time measuring apparatus to accurately measure the time in which the image forming apparatus stays in one or more modes. The image forming apparatus comprises a first CPU which outputs a pulse signal to a receiving second CPU. The second CPU calculates, by using the received pulse signal, a timer error of a second clock signal. The time measuring apparatus measures time in one or more modes based on the second clock signal and then corrects the measured time using the calculated timer error.

8 Claims, 3 Drawing Sheets

TIME MEASURING APPARATUS AND IMAGE FORMING APPARATUS

INCORPORATION BY REFERENCE

This application is based upon and claims the benefit of priority from the corresponding Japanese Patent Application No. 2008-011792, filed Jan. 22, 2008, the entire contents of which is incorporated herein by reference.

FIELD OF THE INVENTION

The present invention generally relates to a time measuring apparatus and an image forming apparatus. More particularly, the present invention relates to a time measuring apparatus for generating and outputting a clock signal so as to be able to measure time and an image forming apparatus that includes at least one time measuring apparatus.

BACKGROUND OF THE INVENTION

An image forming apparatus typically has both a normal mode and a power saving mode. In the normal mode, for example, an image fixing device is maintained at an appropriate temperature to fix a developer such as toner, and therefore the image forming apparatus is allowed to form an image as soon as a request for forming an image is received. However, power consumption is increased so as to constantly maintain the image fixing device at the appropriate temperature in the normal mode.

In a power saving mode, for example, the image fixing device as described above is maintained at a temperature higher than a room temperature but lower than the temperature in the normal mode. Therefore additional time is necessary for the image forming apparatus to heat the image fixing device so as to reach the appropriate temperature after a request for forming an image is received. However, the power consumed while in the power saving mode may be reduced as compared to power consumed while in the normal mode.

The image forming apparatus as described above often has a plurality of CPUs including, but not limited to, for example, a main CPU and a sub CPU. In this case, in the normal mode, the main CPU controls an operation performed by the image forming apparatus. Specifically, the main CPU controls the image forming operation entirely. On the other hand, in the power saving mode, the sub CPU controls an operation performed by the image forming apparatus. Specifically, the sub CPU controls time for the image forming apparatus to operate in the power saving mode. In the power saving mode, the main CPU suspends its operation so as to reduce power consumption.

A technique that uses measured times to restore a facsimile apparatus to the normal mode from a power saving mode has been suggested. In this technique, the sub CPU has two types of timers, and causes two types of timers to each measure time differently from each other respectively.

This technique employs two types of timers which operate in accordance with an operation performed by a clock generator. A crystal oscillator is generally accurate but expensive when used as a clock generator. When such a crystal oscillator is used also for a sub CPU, the costs of apparatuses such as facsimiles, printers and copiers increase. On the other hand, when a less expensive but less accurate clock generator is used for a time measuring apparatus or the like, it may be difficult or insufficient to appropriately control the apparatus.

SUMMARY OF THE INVENTION

A time measuring apparatus according to one embodiment of the present invention comprises a first CPU and a second CPU. The second CPU is connected to a first CPU for outputting a first clock signal and for generating and outputting a second clock signal including a timer error. The timer error output is larger than a timer error of the first clock signal. The second CPU can also measure a time based on the second clock signal. The second CPU comprises a receiving unit that receives the first clock signal, and a correction unit that corrects the measured time based on the second clock signal by using the first clock signal received by the receiving unit.

The above and other objects, features, and advantages of the present invention will be more apparent from the following detailed description taken in conjunction with the accompanying drawings.

In this text, the terms "comprising", "comprise", "comprises" and other forms of "comprise" can have the meaning ascribed to these terms in U.S. Patent Law and can mean "including", "include", "includes" and other forms of "include".

The various features of novelty which characterize the invention are pointed out in particularity in the claims annexed to and forming a part of this disclosure. For a better understanding of the invention, its operating advantages and specific objects attained by its uses, reference is made to the accompanying descriptive matter in which exemplary embodiments of the invention are illustrated in the accompanying drawings in which corresponding components are identified by the same reference numerals.

BRIEF DESCRIPTION OF THE DRAWINGS

The following detailed description, given by way of example, but not intended to limit the invention solely to the specific embodiments described, may best be understood in conjunction with the accompanying drawings, in which.

DETAILED DESCRIPTION OF THE PREFERRED EMBODIMENTS

Reference will now be made in detail to various embodiments of the present invention, one or more examples of which are illustrated in the accompanying drawings. Each example is provided by way of explanation of the present invention, and by no way limiting the present invention. In fact, it will be apparent to those skilled in the art that various modifications, combination, additions, deletions and variations can be made in the present invention without departing from the scope or spirit of the present invention. For instance, features illustrated or described as part of one embodiment can be used in another embodiment to yield a still further embodiment. It is intended that the present invention covers such modifications, combinations, additions, deletions, applications and variations which come within the scope of the appended claims and their equivalents.

Figure 1:
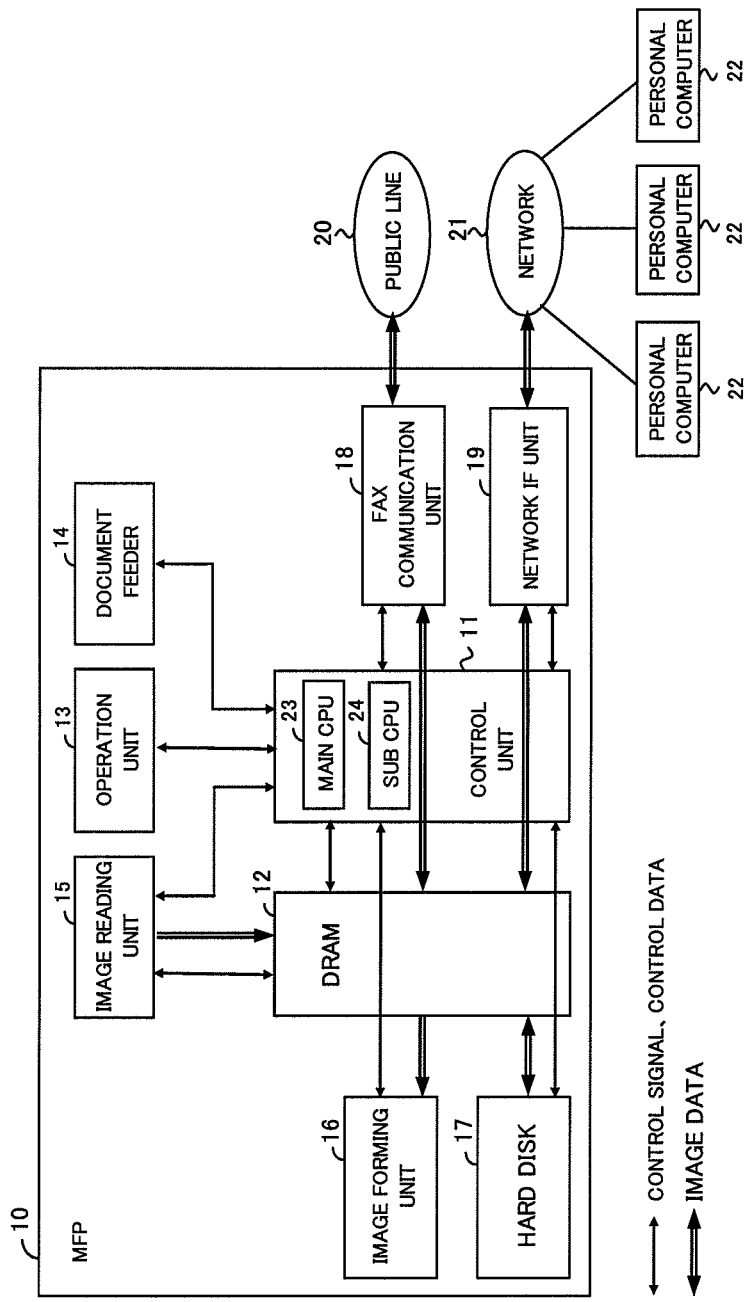
FIG. 1 is a block diagram showing a configuration of a digital multifunction peripheral 10 to which an image forming apparatus, having a time measuring apparatus according to one embodiment of the present invention, is applied.

In FIG. 1, a thick arrow represents a flow of image data, and a thin arrow represents a flow of a control signal or control data.

FIG. 1 shows a digital multifunction peripheral 10 comprising: a control unit 11 for entirely controlling the digital multifunction peripheral 10, and a dynamic random access memory (DRAM) 12 in which image data and the like are written and from which image data and the like are read. The digital multifunction peripheral 10 further comprises: an operating unit 13, a document feeder 14, an image reading unit 15, an image forming unit 16, a hard disk 17, a facsimile communication unit 18, a network interface (IF) unit 19, a public line 20 and a network 21. The operating unit 13 further comprises a display screen for displaying information stored in the digital multifunction peripheral 10 and acts as an interface between the digital multifunction peripheral 10 and a user thereof. The document feeder 14 automatically feeds a document to a predetermined position at which the document is to be read by an image reading unit 15. The image reading unit 15 reads a document by using a scanner. The image forming unit 16 forms an image based on image data of the document having been read by the image reading unit 15 and outputs the image on paper. The multifunction peripheral 10 includes a hard disk 17 for storing image data and the like. The facsimile communication unit 18 connects to a public line 20 and the network IF unit 19 connects the digital multifunction peripheral 10 to the network 21.

The digital multifunction peripheral 10 uses DRAM 12 to act as a copying apparatus which in turn causes the image forming unit 16 to form an image. The image is based on image data of a document read by the image reading unit 15. Further, the digital multifunction peripheral 10 may use the DRAM 12 to act as a printer by causing the image forming unit 16 to form an image based on image data transmitted through the network IF unit 19 from a personal computer 22 connected to the network 21. Moreover, the digital multifunction peripheral 10 using the DRAM 12 may act as a facsimile apparatus to cause the image forming unit 16 to form an image based on image data transmitted through the facsimile communication unit 18 from the public line 20, and to transmit image data of a document read by the image reading unit 15 through the facsimile communication unit 18 to the public line 20.

Further, the digital multifunction peripheral 10 has a normal mode as a primary mode and a power saving mode as a secondary mode. In the primary mode, it is possible for the multifunction peripheral 10 to form an image within a predetermined time period immediately after receiving a request for forming an image. In the secondary mode, a time period necessary for enabling an image to be formed is longer than the time period which is necessary in the primary mode.

In the normal mode, for example, an image fixing device (not shown) provided in the image forming unit 16 is maintained at an appropriate temperature for fixing developer powder such as toner. Having the appropriate temperature makes it possible to form an image as soon as an image forming request is received. Specifically, when an image forming request is received, the image forming unit 16 forms an electrostatic latent image on a photo conductor (not shown) based on image data of a document. The image forming unit 16 transfers colored toner(s) to the electrostatic latent image so as to form a toner image. The image forming unit 16 transfers the toner image to the fed paper, and fixes an image by means of an image fixing device. Therefore, in the normal mode in which the image fixing device is maintained at an appropriate temperature, the image forming unit 16 is allowed to immediately form an image upon receipt of a request.

In the power saving mode, for example, the image fixing device as described above is maintained at a temperature which is higher than a room temperature but lower than the temperature the image fixing device is maintained at in its normal mode. As a result, some time is necessary to warm-up the image fixing device so as to reach the appropriate temperature after receiving an image forming request. Therefore, the image forming unit 16 cannot immediately form an image in the power saving mode.

The digital multifunction peripheral 10 consumes electrical power in the normal mode in order to maintain the image fixing device at the appropriate temperature as described above. On the other hand, the digital multifunction peripheral 10 in the power saving mode consumes less electrical power when the image fixing device is maintained at a reduced temperature. Consequently, electrical power consumed by the digital multifunction peripheral 10 in the normal mode is larger than power consumed in the power saving mode.

The control unit 11 compresses and encodes image data of a document. The image reading unit 15 supplies the image data. The control unit 11 writes the compression coding image data in the DRAM 12; reads the image data written in the DRAM 12; decompresses and decodes the read image data; and causes the image forming unit 16 to output an image.

Further, the control unit 11 comprises a main CPU 23 as a first CPU, and a sub CPU 24 as a second CPU.

Figure 2:
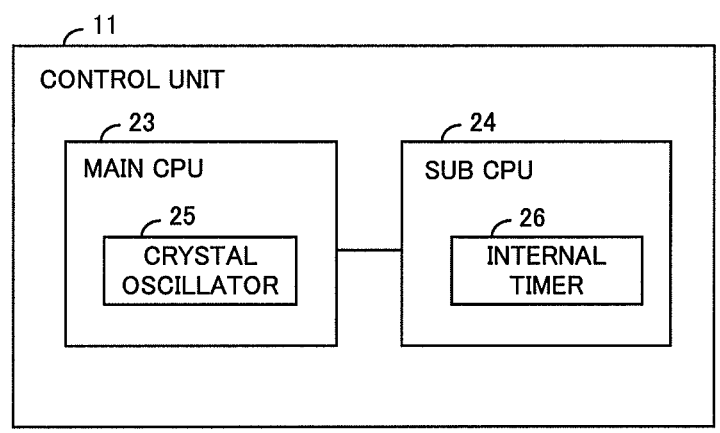
FIG. 2 is a block diagram showing an exemplary configuration of a control unit according to one embodiment of the present invention.

As shown in FIG. 2, the main CPU 23 has a crystal oscillator 25. The main CPU 23 outputs a first clock signal by means of the crystal oscillator 25. The main CPU 23 operates, in the normal mode, to control operations performed by the digital multifunction peripheral 10. Specifically, the main CPU 23 controls entirely, based on the first clock signal, the image forming operations performed by the digital multifunction peripheral 10.

The sub CPU 24 has an internal timer 26. Generally, the internal timer 26 is not as precise as the crystal oscillator 25. In other words, a timer error in the internal timer 26 is larger than the timer error occurring in the crystal oscillator 25. The sub CPU 24 generates and outputs a second clock signal by means of the internal timer 26. In the power saving mode, the sub CPU 24 operates to control operations performed by the digital multifunction peripheral 10. Specifically, the sub CPU 24 measures, based on the second clock signal, a time period during which the digital multifunction peripheral 10 operates in the power saving mode. When the digital multifunction peripheral 10 sets the time to switch from the power saving mode to the normal mode, the sub CPU 24 starts to measure the time period the digital multifunction peripheral 10 is in the power saving mode based on the second clock signal. When the set time has come, the digital multifunction peripheral 10 switches from the power saving mode to the normal mode. In other words, the digital multifunction peripheral 10 is restored so as to be able to form an image immediately upon request.

Figure 3:
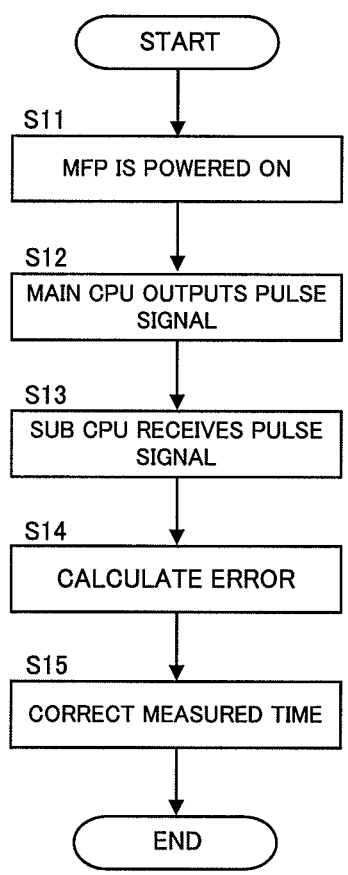
FIG. 3 is a flow chart showing an operation for measuring time based on a second clock signal according to yet one embodiment of the present invention.

FIG. 3 is a flow chart showing an operation for measuring the time based on the second clock signal according to one embodiment of the present invention. An operation for measuring the time based on the second clock signal will be described with reference to FIGS. 1 to 3.

Initially, the digital multifunction peripheral 10 is powered on (step S11 in FIG. 3, hereinafter "step" will be omitted). The main CPU 23 outputs a first clock signal to the sub CPU 24 (S12). In one embodiment, the outputted pulse signal may have a frequency of 1.0 kHz.

Thereafter, the sub CPU 24 receives the pulse signal outputted by the main CPU 23 (S13). At this time, the sub CPU 24 acts as a receiving unit. The sub CPU 24 measures the frequency of the received pulse signal by means of the internal timer 26. If in the embodiment where the outputted pulse signal has a frequency of 1.0 kHz, then the frequency measured by the sub CPU 24 may be 1.1 kHz.

The sub CPU 24 calculates a timer error in time based on the second clock signal generated from the internal timer 26. The timer error is calculated in the following manner. First, a difference between the frequency measured by the sub CPU 24 and the main CPU 23 is calculated. By way of example, in one embodiment, the difference is calculated as 1.1 kHz−1.0 kHz=0.1 kHz.

Thereafter, the sub CPU 24 calculates the timer errors as the difference in frequency divided by the frequency outputted by the main CPU 23 multiplied by 100. The calculation for the timer error, for example, is based on the numbers above: 0.1 kHz÷1.0 kHz×100=10% (S14). The sub CPU 24 corrects by using the timer error the time measured based on the second clock signal (S15). In the example described above, the 0.1 kHz corresponding to 10% of 1.0 kHz is subtracted from the measured frequency. That is, the correction is calculated as 1.1 kHz−0.1 kHz=1.0 kHz.

Specifically, the sub CPU 24 measures a time period during which the digital multifunction peripheral 10 operates in a power saving mode as described above. In a case where the predetermined time period is, for example, 30 minutes, the time period measured by the sub CPU 24 may be 33 minutes when only the second clock signal of the sub CPU 24 is used. In other words, the measured time period, i.e., 33 minutes, includes a timer error of plus 10 percent (%). Therefore, the time based on the second clock signal can be corrected by using the timer error calculated in S14 to obtain a correct time of 30 minutes. In this instance, the sub CPU 24 acts as a correction unit.

Therefore, the sub CPU 24 corrects the time measured based on the internal timer 26 that has a timer error which is larger than a timer error of the first clock signal. Therefore, the time measuring apparatus as described above is inexpensive and is capable of measuring time accurately.

Furthermore, the digital multifunction peripheral 10 which includes a time measuring apparatus as described above is inexpensive and is capable of measuring time accurately.

Although in one embodiment of the present invention the sub CPU 24 measures the time period during which the digital multifunction peripheral 10 operates in the power saving mode, the present invention is not limited thereto. In other embodiments the image forming unit 16 may include a heater for preventing toner aggregation, and the sub CPU 24 may control, in the power saving mode, the time period when the heater performs heating. Alternatively, the digital multifunction peripheral 10 may include a detection unit that detects a remaining amount of paper and the sub CPU 24 may control the detection unit so as to detect a remaining amount of paper at a predetermined time in the power saving mode.

Moreover, although according to one embodiment of the present invention the sub CPU 24 controls operations performed by the digital multifunction peripheral 10 in the power saving mode, the sub CPU 24 may control operations performed by the digital multifunction peripheral 10 in the normal mode.

The present invention, however, is not limited to the embodiment as described above where the digital multifunction peripheral 10 can have two modes, namely, a normal mode and a power saving mode. According to other embodiments of the present invention the digital multifunction peripheral 10 may have three or more modes.

Furthermore, the present invention is not limited to the exemplary embodiment described above where at a time when the digital multifunction peripheral 10 is powered on, a first clock signal is received so as to calculate the timer error, and then the time measured based on a second clock signal is corrected by using the timer error. Alternatively, in other embodiments in accordance with the present invention the first clock signal may be received at a time at which image formation is completed, or at any other suitable time. Moreover, the sub CPU 24 may regularly receive signals from the first clock signal and in turn calculate the timer error each time when the first clock signal is received in order to correct the time measured based on the second clock signal.

In addition, although in one embodiment of the present invention the main CPU 23 is described as being included in the control unit 11 of the digital multifunction peripheral 10, the present invention is not limited thereto. The main CPU 23 may be included in, for example, an external device such as the personal computer 22.

Further, although the present invention has been thus described by an exemplary embodiment where the main CPU 23 outputting the first clock signal is done by means of a crystal oscillator 25, the CPU 23 may output the clock signal by using another type of oscillator.

Additionally, the first clock signal described above as a pulse signal may be another type of control signal. The time measuring apparatus included in the image forming apparatus controls the time for the image forming apparatus. However, in other embodiments the time measuring apparatus may be included in, for example, another apparatus such as an electronic apparatus.

Although an embodiment of the present invention was described with reference to the drawings, the above described and illustrated embodiment only shows the present invention illustratively. Therefore, various kinds of modifications and variations can be added within the same scope or an equivalent scope as in the present invention.

What is claimed is:

1. An image forming apparatus operating in at least two modes including a normal mode and a power-saving mode comprising:
    a first CPU configured for controlling operations performed by the image forming apparatus in the normal mode and configured to suspend its operation in the power-saving mode, the first CPU including an oscillator for generating and outputting a first clock signal;
    a second CPU connected to the first CPU and configured for controlling operations performed by the image forming apparatus in the power-saving mode and for controlling the amount of time the image forming apparatus operates in the power-saving mode, the second CPU including a timer for generating and outputting a second clock signal having a timer error larger than the timer error of the first clock signal, and the second CPU configured for measuring a time period based on the second clock signal; and
    a detection unit configured to detect a remaining amount of paper;
    wherein the second CPU has a receiving unit that receives the first clock signal and a correction unit that corrects the time period measured based on the second clock signal by using the first clock signal received by the receiving unit, and controls the detection unit so as to detect a remaining amount of paper in response to the second CPU measuring a predetermined time period in the power-saving mode.

2. The image forming apparatus according to claim 1, wherein the image forming apparatus switches from the power-saving mode to the normal mode in response to an image forming job request and the first CPU controls the execution of the image forming job request.

3. The image forming apparatus according to claim 1,
wherein a predetermined time period within which image formation can be enabled is longer in the power-saving mode than in the normal mode; and
wherein the second CPU measures the time when the image forming apparatus is in the power-saving mode.

4. The image forming apparatus according to claim 1, wherein a power consumed by the image forming apparatus operating in the normal mode is larger than a power consumed by the image forming apparatus operating in the power-saving mode.

5. The image forming apparatus according to claim 1, wherein the oscillator is a crystal oscillator.

6. The image forming apparatus according to claim 1, wherein the image forming apparatus switches from the power-saving mode to the normal mode based on the second CPU measuring a predetermined time period in the power-saving mode.

7. The image forming apparatus according to claim 1, wherein the correction unit corrects the time period measured based on the second clock signal by using the first clock signal received by the receiving unit when the image forming apparatus is powered on.

8. The image forming apparatus according to claim 1, wherein said second clock signal is generated without use of crystal oscillator.

* * * * *